March 19, 1929. C. E. HOUSEBERG 1,706,231
MACHINE FOR SOLDERING SQUARE CANS
Filed April 5, 1927 6 Sheets-Sheet 1
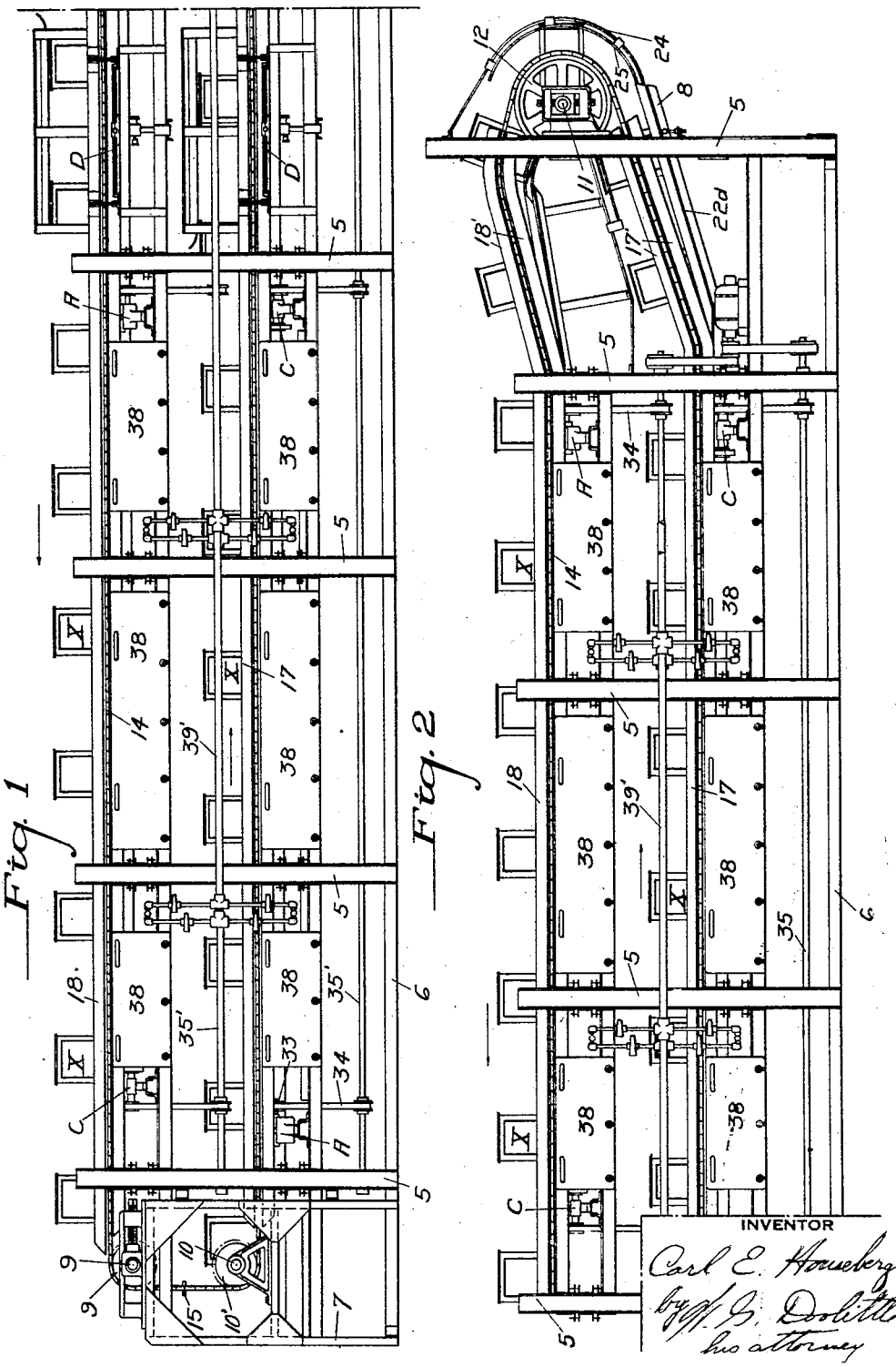

March 19, 1929.   C. E. HOUSEBERG   1,706,231
MACHINE FOR SOLDERING SQUARE CANS
Filed April 5, 1927   6 Sheets-Sheet 2

March 19, 1929.  C. E. HOUSEBERG  1,706,231
MACHINE FOR SOLDERING SQUARE CANS
Filed April 5, 1927   6 Sheets-Sheet 3
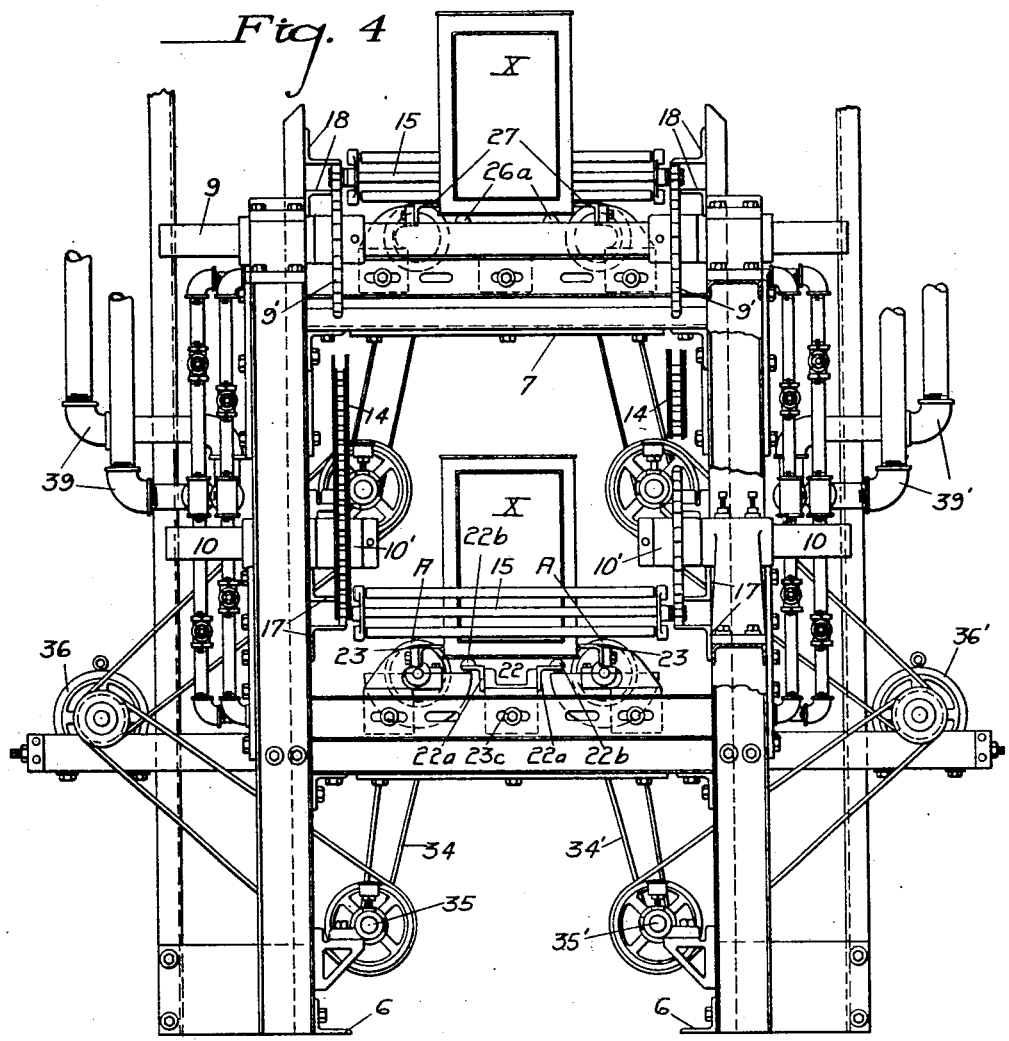
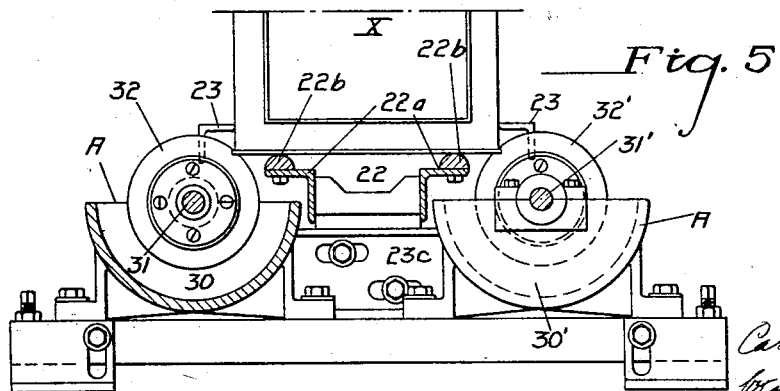

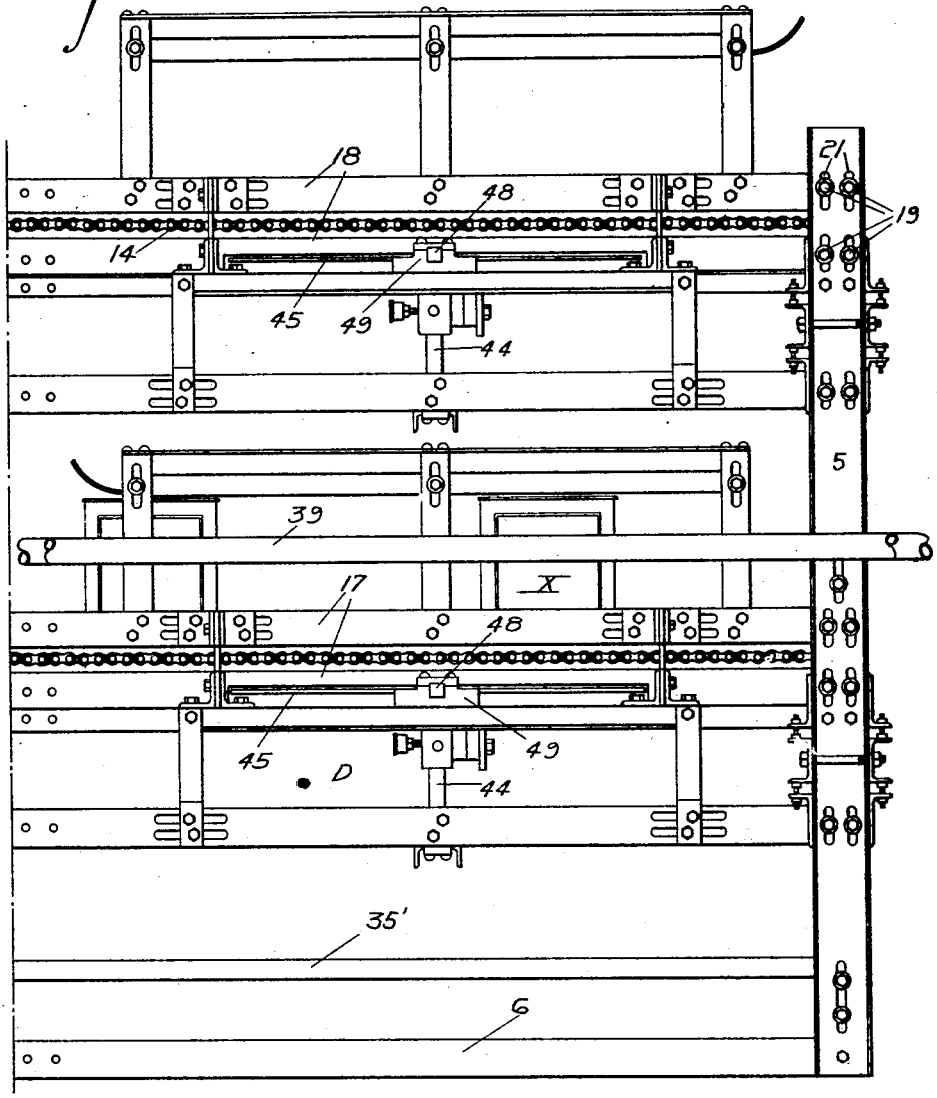
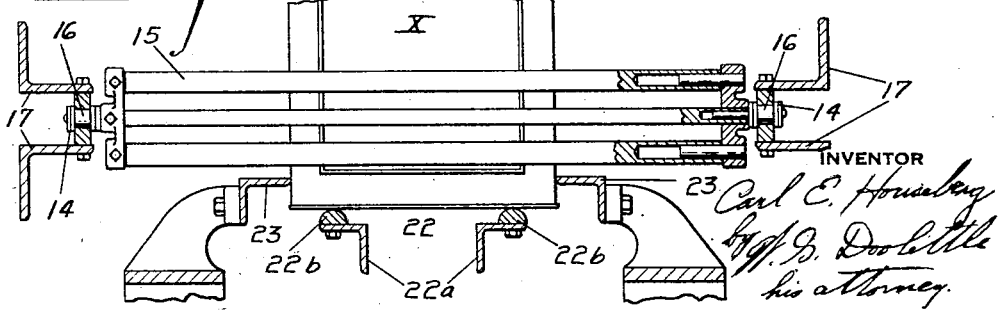

March 19, 1929.  C. E. HOUSEBERG  1,706,231
MACHINE FOR SOLDERING SQUARE CANS
Filed April 5, 1927  6 Sheets-Sheet 5
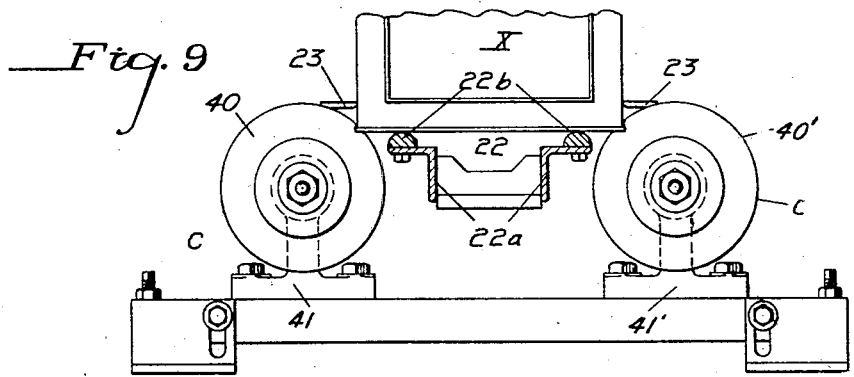
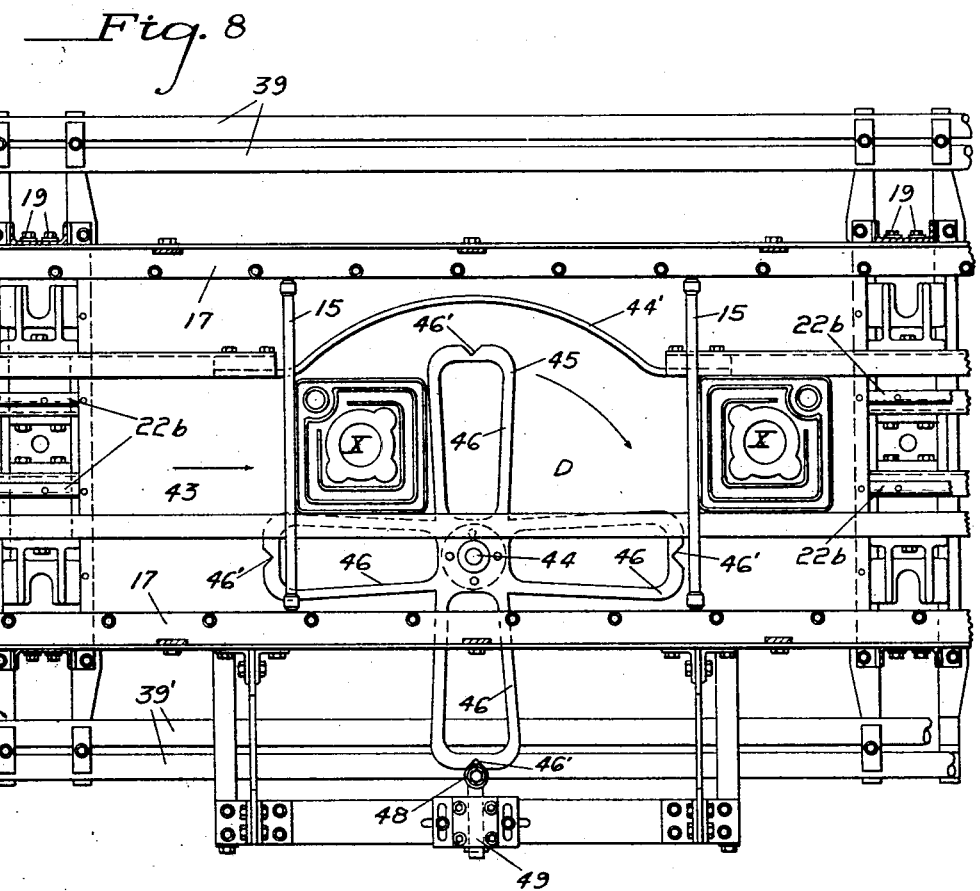
INVENTOR
Carl E. Houseberg
by W. G. Doolittle
his attorney.

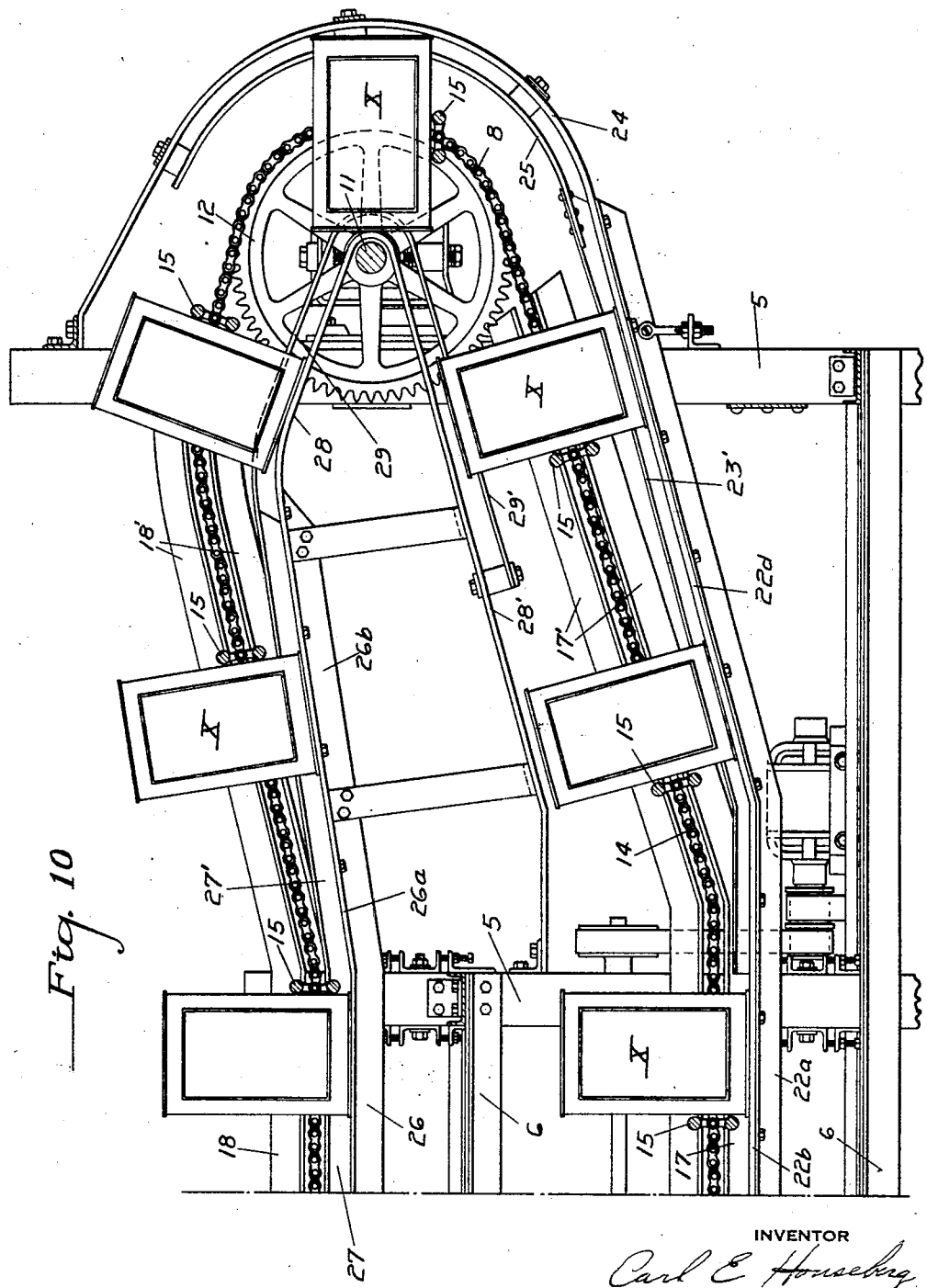

Patented Mar. 19, 1929.

1,706,231

UNITED STATES PATENT OFFICE.

CARL E. HOUSEBERG, OF PITTSBURGH, PENNSYLVANIA.

MACHINE FOR SOLDERING SQUARE CANS.

Application filed April 5, 1927. Serial No. 181,237.

This invention is for a machine for soldering the end or ends in square metal receptacles, particularly square cans.

Due to the fact that square cans can be stored more advantageously than round cans, they are widely used for fluids of different kinds, and the demand for them is steadily increasing. Cans of the type referred to, generally have a pouring spout in the top thereof, and are commonly used for lubricating and other oils, varnishes, and syrups, as well as for various other fluids.

The present invention has for its principal object to provide a machine which will efficiently, rapidly and economically solder the seams at the bottom and top of the cans, and which shall be entirely automatic in its operation.

The present invention has for a further object the provision of a machine of this kind wherein the soldered cans are delivered from the same end of the machine, but at a different point, from where they are fed in, and wherein a minimum amount of floor space is required for the machine.

A further important object of the invention is to provide a machine which is adjustable for cans of different sizes.

Other important objects of the invention reside in a novel mechanism for applying acid or flux to the end seams, means for removing excess acid or flux, means for turning the cans to solder all sides thereof, and means for inverting the cans at the proper time to solder the seams first at one end and then at the other.

The invention is designed for soldering cans which have been formed in the usual way. In the usual process of making square cans, the square body of the can is first formed, after which each end is dipped into a shallow pan of solder, whereby the edges of the metal collect a coating of solder. Then the ends are applied and united thereto by the usual rolled seam. These cans, as thus formed, are then passed through the machine, embodying my invention, which machine is designed to apply acid, a suitable flux to the seams, and heat the seams, whereby the solder on the ends of the can body is melted and flows into the rolled seams.

According to the general plan of the preferred form of the invention, the cans, having the ends rolled-seamed thereon, are moved through the machine by a continuous carrier in vertical position. Each can first passes acid wheels that put acid or flux on the seams along two sides of the bottom of the can. The can then passes between heaters that melt the solder on the two sides where acid has been applied. Then the can is rotated ninety degrees, and the other two edges at the bottom have acid applied thereto by a second pair of acid wheels, after which the can passes through a second series of heaters, setting the solder at the other two sides of the bottom of the can.

The bottom being finished, the can is inverted by the conveyor which travels back above the first series of acid wheels and heaters. The other end of the can is then similarly treated in a second series of acid wheels, heaters, and a turning device, which second series is above the first. Means may be provided after each heating step for removing excess acid.

The invention may be readily understood by reference to the accompanying drawings, which are merely illustrative of an embodiment of my invention, and it will be understood that I do not limit myself to the construction illustrated, as various changes and modifications are within the scope and contemplation of my invention. In the drawings:

Fig. 1 is a side elevation of the front portion of the machine, which is necessarily of considerable length;

Fig. 2 is a similar view of the succeeding portion, and represents a continuation of Fig. 1;

Fig. 4 is an end view of the front part of the machine, as illustrated in Fig. 3;

Fig. 5 is a detail view on a larger scale of one of the several similar acid applying devices, showing a can moving therebetween;

Fig. 6 is a side view, on a larger scale than Fig. 1, of an intermediate part of the machine, including the upper and lower means for rotating the can ninety degrees, and hereinafter referred to as the turnstile mechanism;

Fig. 7 is a transverse section through a portion of the can track and conveyor;

Fig. 8 is a plan view of one of the turnstile mechanisms;

Fig. 9 is a view similar to Fig. 5, showing one of the several excess acid removing units; and Fig. 10 is a view, on a larger scale than Fig. 2, showing the rear end of the machine and illustrating the manner in which the cans are inverted.

Figure 3:
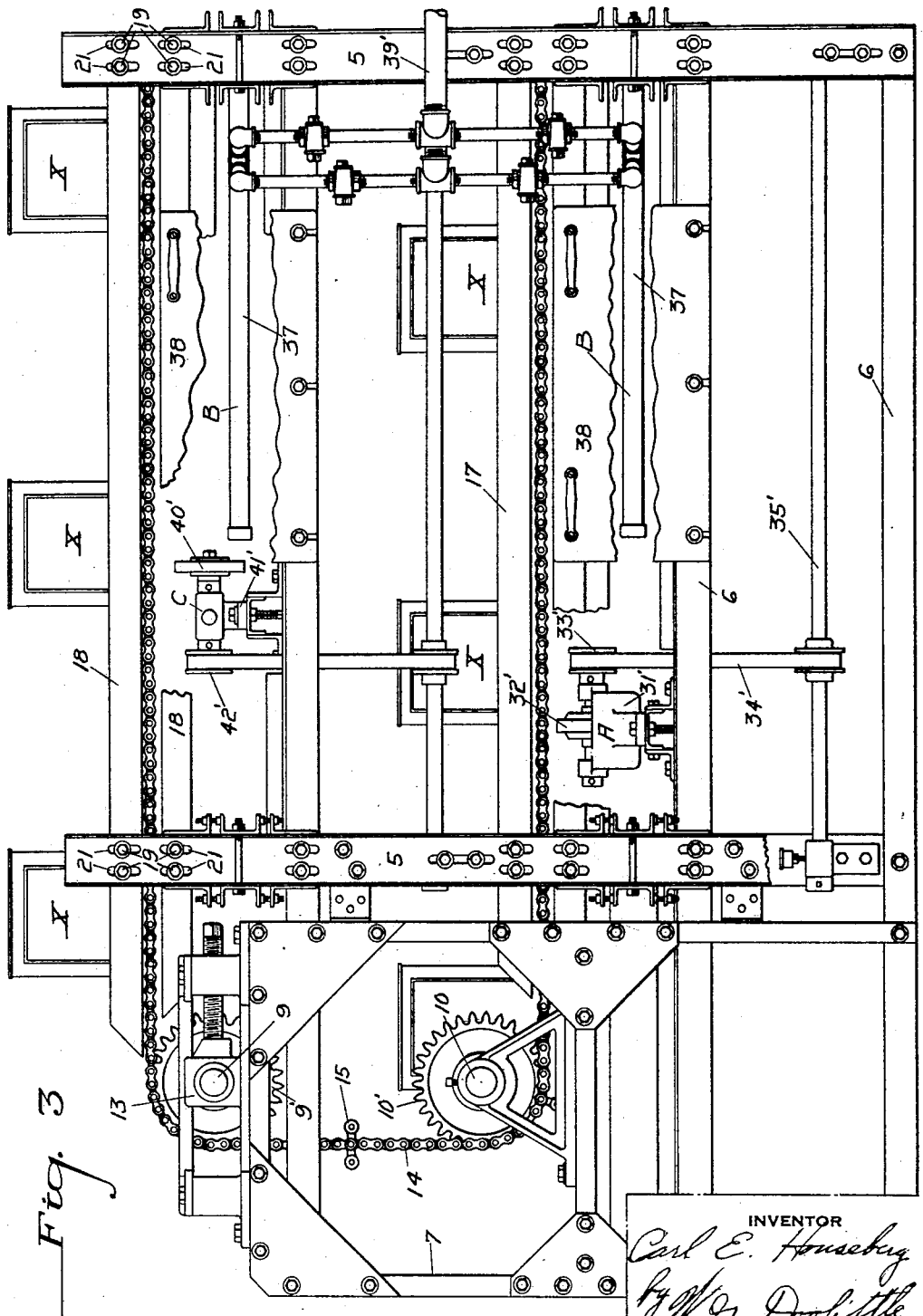
Fig. 3 is a side view on a larger scale of the front end of the machine.

In the drawings, 5 designates the upright members of a supporting frame, and 6 are horizontal frame members. The front of the machine is designated generally as 7, and the rear end as 8.

In the front of the machine, are upper and lower shafts 9 and 10, on each of which are spaced apart sprocket wheels 9' and 10' respectively. At the back of the machine, well above the middle of the vertical distance between shafts 9 and 10, is a main shaft 11 having spaced apart large sprocket wheels 12 thereon. This shaft may be driven by any suitable source of power. As best shown in Fig. 3, shaft 9 is carried in adjustable bearings 13.

At each side of the machine is an endless chain 14 that passes over the respective sprockets 9', 10' and 12. Connecting the chains are transverse flights or pushers 15, having rollers 16 on the ends thereof. These rollers are adapted to engage between spaced apart angle bars 17 at the lower part of the frame, and similar pairs of bars 18 in the upper part of the machine, said bars providing track therefor. The lower angle bars 17 begin immediately back of wheels 10' and extend continuously back to wheels 12. The rearmost portions 17' are inclined upwardly toward the sprockets, as clearly shown in Fig. 10. The upper tracks or bars 18 extend from a point immediately in advance of wheels 12 to a point immediately behind wheels 9'. The rearmost portion of these tracks are also upwardly inclined at 18', as clearly shown in Fig. 10. Tracks or guides 17 and 18 are preferably adjustable vertically in the uprights 5 in which they are supported by means of supporting bolt 19 and nuts 20 in slots 21 in the uprights, as shown, for instance, in Fig. 3.

Disposed midway between the two conveyor chains and in the path of travel of the conveyor flights, is a lower track 22, comprised of spaced apart angle bars 22ª having convexed strips 22ᵇ thereon. These tracks extend substantially continuously along the entire length of the machine, being interrupted only as hereinafter indicated. These tracks are adjustable laterally in the frame, in the adjustable mounting, being indicated at 23ᶜ in the drawings, as, for instance, in Figs. 4 and 5. Associated with these tracks are a pair of spaced apart side guides 23, which are adjustable laterally also. The rear end of tracks 22 slope upwardly (see Fig. 10), as indicated at 22ᵈ, and the side guides 23 are sloped upwardly at 23'. Tracks 22 have extensions 24 that extend around the shaft 11 substantially concentric therewith. Guides 23 are similarly extended by strips 25.

In the upper part of the frame, directly over the lower tracks 22, are similar upper tracks 26, with strips 26ª thereon, and having guides 27 at each side thereof, these tracks and strips being similarly adjustable. The rear ends of tracks 26 also have a slight upward inclination, as indicated at 26ᵇ, as do also the guides 27, as indicated at 27'. Tracks 26 are extended by strips 28 (see Fig. 10) on a sharp incline down from the rearmost end of the inclined portions 26ᵇ to the shaft 11, and around shaft 11 to a point well forward of the shaft, this bent-under strip being designated 28'. Guides 27 are similarly extended around the shaft by strips 29, but the bent-under portion 29' may be of somewhat less length.

From the foregoing, the travel of the cans may be generally outlined. They are placed on tracks 22 at the front end of the machine and are moved along by the cross flights or pushers 15 that engage the cans near the bottom thereof and move along the track for the operations hereinafter described. As they approach the rear shaft 11, they are tilted as they travel along the inclined tracks 22ᵈ. At the same time, the conveyor is guided up by guides 17', but at a sharper angle, causing the pushers or flights 15 to engage higher up on the cans, as clearly illustrated in Fig. 10. As the cans continue to travel around the shaft 11, they are turned to a horizontal position, and then inverted onto the extension 28 of the upper track 26. They are then in an upright inverted position, and are moved along the upper track toward the front of the machine, and as they move off from the inclined portion of the upper track, the flights or pushers 15 of the conveyor move down toward the bottom of the can. Eventually, the cans reach the front of the machine, where they are removed.

As each can moves along the tracks, it is subjected to the action of acid applying units A, heating units B, excess acid removing units C, and can turning units or turnstiles D. There are a plurality of each of the above units, and each unit of a kind is the same, and only one unit of each kind will be described in detail.

Immediately after the can enters the machine, riding on the tracks 22, it passes the first acid or flux applying unit A. One of these units is shown in detail in Fig. 5, and comprises a trough 30 at one side of and below the track, and a similar trough 30' at the other side. Journaled in these troughs are shafts 31 and 31', respectively, and on shaft 31 is a brush 32, and on shaft 31' a similar brush 32'. These brushes are transverse to the path of travel of the cans, and are adapted to apply acid to two opposite lower edges of the square can, designated X, as it moves therebetween. The troughs and brushes are movable laterally for adjustment with the tracks, to which they are adjacent, as shown. Shafts 31 and 31' have pulleys 33 and 33', respectively, whereby they may be rotated through belts 34 and 34', engaging pulleys on the parallel line shafts 35 and 35' respectively. These shafts may be driven in any suitable way, as by motors 36 and 36'.

After passing between the acid wheels of the first unit A, the can is moved through the heating unit. This unit preferably includes elongated burners 37, parallel to the tracks (see Fig. 3) and outside of which are shields or plates 38. The burners are arranged to heat the two edges of the can to which acid was applied in the preceding step, to melt the solder that had been applied to the can blank, as hereinbefore described. The solder thus melted closes the rolled seam on the first two sides of the can. Air and gas may be supplied to the burner through pipes 39 and 39', respectively.

Next, the can passes the first excess solder removing device C. This includes oppositely rotating brushes 40 and 40' on laterally adjustable brackets 41 and 41'. These brushes are also driven through pulleys 42 and 42' from the line shafts 35 and 35'. The revolving brushes remove the excess acid from the two sides of the can.

Traveling past the clearing brushes, the can must be turned ninety degrees, whereby the other two edges of the bottom may be similarly operated. This is preferably effected by a turnstile mechanism D. Adjacent this mechanism, the tracks are interrupted and the can moves off from the tracks onto a flat plate 43 in direct line with the tracks. Mounted to one side of the line of travel of the cans, on a post 44, is a turnstile 45 having four arms 46 thereon. As the can is pushed along the plate 43, it enters between two arms of the turnstile. The continued movement of the conveyor causes the turnstile to rotate. The can is confined by the rotating arms of the turnstile, the conveyor bar or pusher 15, and a curved guide 44, so that, as the conveyor moves along, the turnstile rotates, and the can is revolved ninety degrees from its original position. It is then moved along off the plate 43 onto the tracks 22, which are continued on the opposite side of the turnstile.

In order that the turnstile will always be in proper position to receive and rotate a can, and to limit its rotative movement for each can to ninety degrees, each arm has a notch 46' in the end thereof. A resilient pin or ratchet 48 is provided on a supporting frame 49, for engagement in each notch. This latch or pin is sufficiently firm to normally hold the turnstile from rotating, but yields when the turnstile is engaged by a moving can.

After leaving the first turnstile, the can is passed between a second series of units A, B and C, to effect a soldering and cleaning of the other two seams at the bottom of the can, and one end of the can is complete. After passing the second unit C, the can is near the rear end of the machine, and starts up the inclined rear part 22$^d$ of track 22. It is then inverted in the manner hereinbefore described, and on its return movement on the overhead tracks, passes the third series of units A, B and C, whereby it has two seams at the other end of the can soldered and cleaned. Next, it engages the second turnstile unit D. Leaving this unit, where it is rotated ninety degrees, it moves between the fourth series of units A, B and C, which solder and clean the remaining two end seams of the can, and the completed can may be removed from the front of the machine, above the incoming cans.

The machine as thus described is simple in construction and operation, and is efficient. It is capable of rapid operation, and is entirely automatic throughout. I have shown in the drawings various adjustable connections between parts, and, as illustrated and as can be understood from the drawings, the machine can be adjusted to operate on cans of various sizes. Obviously, also, the invention is not restricted for soldering square cans, as, by suitable adjustment, rectangular cans other than square ones could be soldered, and it will be understood that the term "square" as used in the specification and claims shall include such rectangular or other polygonally shaped cans, and other modifications of the truly square can.

By performing some of the operations on the overhead return path of the conveyor, a ready means of inverting the cans is provided, the floor space required for the machine reduced, and the length of idle conveyor chain minimized.

Various changes and modifications may be made in the construction within the spirit of the invention. Obviously, too, the machine could be arranged so that the cans would be fed onto the top of the conveyor, and delivered at the bottom.

I claim as my invention:

1. Apparatus for soldering the end seams of both ends of square cans by a continuous operation comprising a frame having an upper and lower can supporting track therein, a continuous conveyor including spaced apart chains, a transversely extending can pusher means attached to said chains, said conveyor mounted for travel adjacent the upper and lower tracks, can soldering units along both the lower and upper tracks, said upper and lower tracks having vertically curved overlapping spaced apart end portions adjacent one end of the continuous conveyor whereby cans moving along the bottom track may be transferred to the upper track, and inverted by such transfer.

2. Apparatus for soldering the end seams of both ends of square cans by a continuous operation comprising a frame having an upper and a lower track carried thereby, a continuous conveyor including two spaced apart chains in the frame having upper and lower runs mounted to travel adjacent the upper and lower tracks, respectively, can pushing means attached to the chains of the conveyor and including a transversely extending member, said upper and lower tracks at one end of the frame being curved toward each other, the portion of the conveyor between the upper and lower runs traveling between the curved portions of the tracks, these portions serving to guide the cans from one track to the other and to invert them, which portions are spaced apart but overlap, and means for guiding said conveyor to cause the pushing means to normally engage the cans close to the track on which they are traveling, said means being arranged to cause the pushing means to engage the cans higher above the tracks when they are passing around the curved track portions.

3. In a device for soldering the seams of both ends of square cans by a continuous operation, a lower track and an upper track for directly supporting the cans and along which the cans travel, means for moving the cans along the tracks, means for inverting the cans and transferring them from the lower to the upper track, rotatable wheels at each side of the tracks for engaging two bottom edges of a can moving therebetween, and means for supplying acid to the wheels.

4. In a device for soldering the seams of both ends of square cans by a continuous operation, a lower track and an upper track for directly supporting the cans and along which the cans travel, means for moving the cans along the tracks, means for inverting the cans and transferring them from the lower to the upper track, rotatable wheels at each side of the tracks for engaging two bottom edges of a can moving therebetween, means for supplying acid to the wheels, other wheels for brushing off excess acid following the acid wheels, and heating means interposed between the acid wheels and the acid removing wheels.

5. Apparatus for soldering the end seams of square cans comprising a track on which the cans are directly supported and along which cans may move in upright position, means for moving the cans along the track, comprising an endless conveyor and can pushing means secured thereto, a plurality of seam soldering units along the track, can rotating means including a turnstile adjacent and projecting over the track, and a position-check for the turnstile.

6. Apparatus for soldering the seams of both ends of cans in a continuous operation including a lower and an upper track on which the cans to be treated are directly supported and travel means for moving the tracks laterally, pusher means for the cans including revoluble cross members, a traveling belt for moving the pusher means, means for inverting the cans and transferring them from one track to another, and soldering means positioned adjacent said tracks.

7. Apparatus for soldering the seams of both ends of cans in a continuous operation including a track for slidably and directly supporting the cans, pusher means for the cans, means for moving the pusher means along the track including a pair of spaced apart chains to which the pusher means are attached, a second track, means for inverting the cans and transferring them from one track to another, similar means for moving the inverted cans along the second track, and soldering means positioned adjacent said tracks.

8. Apparatus for soldering the seams of both ends of cans in a continuous operation including a lower and an upper track on which the cans to be treated are directly supported and travel, means for slidably moving the cans along said tracks including a belt having spaced apart chains and transversely extending can pushing means attached to said chains, a turn-stile associated with each of said tracks, means for inverting the cans and transferring the cans from one track to another, and soldering means positioned adjacent the tracks.

9. Apparatus for soldering the end seams of both ends of square cans by a continuous operation comprising an endless chain conveyor having can pushing devices thereon, a lower and an upper track upon which the cans are directly supported and along which cans may be moved by the conveyor, seam soldering units disposed in succession along the tracks, a turn-stile associated with each track disposed between two units for effecting a partial rotation of the can while moving from one of said two units to the next, means for inverting the cans and transferring them from the lower to the upper track, and means for soldering the seams of the opposite ends of the cans as they are moved along said tracks.

In testimony whereof I affix my signature.

CARL E. HOUSEBERG.